US009557244B2

(12) United States Patent
Rust (10) Patent No.: US 9,557,244 B2
(45) Date of Patent: Jan. 31, 2017

(54) THRUST BIAS DETECTION SYSTEM (71) Applicant: Caterpillar Inc., Peoria, IL (US)

(72) Inventor: Craig Richard Rust, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 260 days.

(21) Appl. No.: 14/537,204

(22) Filed: Nov. 10, 2014

(65) Prior Publication Data
US 2016/0131544 A1 May 12, 2016

(51) Int. Cl.
| G01L 5/00 | (2006.01) |
|---|---|
| G01M 17/03 | (2006.01) |
| G01M 13/02 | (2006.01) |
| B62D 55/08 | (2006.01) |

(52) U.S. Cl.
CPC ........... G01M 13/023 (2013.01); G01M 17/03 (2013.01); B62D 55/08 (2013.01)

(58) Field of Classification Search
CPC .......................... G01M 13/023; G01M 17/03
See application file for complete search history.

(56) References Cited

U.S. PATENT DOCUMENTS

| 3,815,426 | A | 6/1974 | Rohner |
|---|---|---|---|
| 3,958,445 | A | 5/1976 | Howard et al. |
| 4,790,190 | A | 12/1988 | Bambara et al. |
| 4,926,521 | A | 5/1990 | Jardine |
| 5,348,515 | A | 9/1994 | Miller |
| 5,436,612 | A | 7/1995 | Aduddell |
| 5,636,026 | A | 6/1997 | Mian et al. |
| 6,024,183 | A | 2/2000 | Dietz et al. |
| 6,027,185 | A | 2/2000 | Crabb |
| 6,107,917 | A | 8/2000 | Carrender et al. |
| 6,250,429 | B1 | 6/2001 | Kramer |
| 6,276,768 | B1 | 8/2001 | Miller |
| 6,305,763 | B1 | 10/2001 | Oertley |
| 6,354,678 | B1 | 3/2002 | Oertley |

(Continued)

FOREIGN PATENT DOCUMENTS

| EP | 2 175 423 | 4/2010 |
|---|---|---|
| EP | 2 548 665 | 1/2013 |

(Continued)

OTHER PUBLICATIONS

Zhange, Z X et al., Measurements of cutter forces and cutter temperature of boring machine in Aspo Hard Rock Laboratory, Tech. Rpt TR-01-34, Apr. 2001.

(Continued)

Primary Examiner — Blake A Tankersley
Assistant Examiner — Quang X Nguyen
(74) Attorney, Agent, or Firm — Finnegan, Henderson, Farabow, Garrett & Dunner, LLP (57) ABSTRACT A thrust bias detection system for a mobile machine is disclosed. The mobile machine may have a first track assembly and a second track assembly. The thrust bias detection system may have a first wear sensor configured to generate a signal indicative of a first wear measurement of a first track link surface, and a second wear sensor configured to generate a signal indicative of a second wear measurement of a second track link surface. The thrust bias detection system may also have a controller in communication with the first and second wear sensors and configured to determine whether at least one of the first and second track assemblies has experienced thrust bias, based on the signals.

17 Claims, 3 Drawing Sheets

(56) References Cited

U.S. PATENT DOCUMENTS

| | | |
|---|---|---|
| 6,360,850 B1 | 3/2002 | Odisho et al. |
| 6,431,008 B1 | 8/2002 | Oertley et al. |
| 6,477,893 B1 | 11/2002 | Djordjevic |
| 6,569,046 B1 | 5/2003 | Gregg |
| 6,682,155 B2 | 1/2004 | Hoff et al. |
| 6,845,306 B2 | 1/2005 | Henry et al. |
| 6,868,711 B2 | 3/2005 | Ebi |
| 6,948,783 B2 | 9/2005 | Hoff |
| 7,014,271 B2 | 3/2006 | Burger et al. |
| 7,032,740 B2 | 4/2006 | Hochhaus et al. |
| 7,172,257 B2 | 2/2007 | Tamaru et al. |
| 7,177,553 B2 | 2/2007 | Ono |
| 7,210,750 B2 | 5/2007 | Yamamoto et al. |
| 7,237,631 B2 | 7/2007 | Livesay et al. |
| 7,239,242 B2 | 7/2007 | Ghosh |
| 7,374,257 B2 | 5/2008 | Oertley |
| 7,507,965 B2 | 3/2009 | Lane et al. |
| 7,540,374 B2 | 6/2009 | Rathbun et al. |
| 7,698,946 B2 | 4/2010 | Clarke et al. |
| 7,764,173 B2 | 7/2010 | Yamagiwa |
| 7,908,928 B2 | 3/2011 | Vik et al. |
| 7,914,086 B2 | 3/2011 | Mulligan |
| 8,100,483 B2 | 1/2012 | Diekevers et al. |
| 8,169,311 B1 | 5/2012 | Breed |
| 8,326,549 B2 | 12/2012 | Ishizaki et al. |
| 8,335,606 B2 | 12/2012 | Mian et al. |
| 8,398,182 B2 | 3/2013 | Simula et al. |
| 8,426,813 B2 | 4/2013 | Furry |
| 8,540,325 B2 | 9/2013 | Diekevers et al. |
| 8,543,283 B2 | 9/2013 | Boss et al. |
| 8,596,126 B2 | 12/2013 | Oliver et al. |
| 8,600,611 B2 | 12/2013 | Sieze |
| 2002/0116992 A1 | 8/2002 | Rickel |
| 2006/0044146 A1 | 3/2006 | Ferguson et al. |
| 2006/0243839 A9 | 11/2006 | Barscevicius et al. |
| 2007/0044447 A1 | 3/2007 | Viaud |
| 2007/0088523 A1 | 4/2007 | Keller et al. |
| 2009/0099886 A1 | 4/2009 | Greiner et al. |
| 2009/0297273 A1 | 12/2009 | Lindbergh et al. |
| 2009/0313860 A1 | 12/2009 | Breiner et al. |
| 2010/0013594 A1 | 1/2010 | Komine et al. |
| 2011/0046857 A1 | 2/2011 | Farmer et al. |
| 2012/0043980 A1 | 2/2012 | Davies |
| 2013/0082846 A1 | 4/2013 | McKinley et al. |
| 2013/0255354 A1 | 10/2013 | Hawkins et al. |
| 2014/0105481 A1 | 4/2014 | Hasselbusch et al. |
| 2014/0229120 A1 | 8/2014 | Luharuka et al. |

FOREIGN PATENT DOCUMENTS

| | | |
|---|---|---|
| JP | 2000-042694 | 2/2000 |
| KR | 101087961 | 5/2011 |
| WO | WO 99/51996 | 10/1999 |
| WO | WO 2006/116758 | 11/2006 |
| WO | WO 2006/117331 | 10/2010 |
| WO | WO 2013/057275 | 4/2013 |
| WO | WO 2014/00507 | 1/2014 |

OTHER PUBLICATIONS

Behmlander, Matthew J., et al., "Erosion Monitoring System for Ground Engaging Tool," U.S. Appl. No. 13/866,394, filed Apr. 19, 2013.

De Broissia, M. et al, "Global Optimisation of Disc Cutter Tool Life for Tunnel Boring Machine Preparing 4th Eurothen Workshop" *Bougues Travaux Publics*, published Mar. 1, 2000.

EPO International PCT/US2006/016518, filing date Oct. 30, 2006.

EPO International Search Report, PCT/US2012/057831, filing date Sep. 28, 2012.

McKinley, Timothy Allen, et al., "Sensor System and Method," U.S. Appl. No. 13/628,662, filed Sep. 27, 2012.

Shanahan, A. Cutter Instrumentation System for Tunnel boring Machines, *The Robbins Co.*, Kent, WA available Sep. 17, 2010.

McKinley, Timothy Allen, et al., "Track Link Having a Wear Sensing Device," U.S. Appl. 14/466,982, filed Aug. 23, 2014.

Hasselbusch, Michael, et al., "Track Assembly Having a Wear Monitoring System," U.S. Appl. No. 14/534,649, filed Nov. 6, 2014.

THRUST BIAS DETECTION SYSTEM

TECHNICAL FIELD

The present disclosure is directed to a detection system and, more particularly, to a thrust bias detection system.

BACKGROUND

A mobile machine may be used to perform various types of work on different worksites, such as a construction site, a demolition site, a mining site, or a landfill site. For example, a bulldozer may be used to push soil and rock on a construction site. The bulldozer, as a track-type mobile machine, includes a tracked undercarriage with tracks on the left and right sides of the machine. Each of the tracks includes a chain formed by connecting a number of track links to one another, and connecting a number of track shoes to the chains. The tracks are supported and guided in movement by various driver, idler, and/or roller assemblies on both sides of the machine.

Operation of the mobile machine inevitably results in wear or damage to various components, including components of the undercarriage such as the track links, idler, and roller assemblies. For example, as a track assembly operates, a surface of each track link may wear away through contact with other components of the track assembly, machine, and/or outside materials (e.g., the ground). When a component experiences a certain amount of wear, the component has exceeded its usable lifetime and should be replaced. When the undercarriage as a whole experiences a certain amount of wear, an overhaul of the undercarriage may be necessary.

It is known to service or replace an undercarriage component, for example, when the component exceeds its expected lifetime (based on the age of the component or number of hours of use experienced by the component), or based on the results of inspection or evaluation of the component, in addition, wear sensors have been developed to monitor track wear. One such wear sensor is disclosed in U.S. Patent Application Publication 2013/0255354 by Hawkins et al, published Oct. 3, 2013 ("the '354 publication"). In particular, the '354 publication includes a wear sensor for automated detection of problems with the bearings or lubrication of a roller assembly that may have occurred due to track wear. While these means may be suitable for detecting normal, expected wear of a track assembly, they may be less than optimal when certain less-common types of wear occur.

One such type of wear may occur as a result of thrust bias. Thrust bias, which may be caused by a machine condition that creates a lateral force on a track assembly, may cause accelerated wear at surfaces that would not normally be expected to experience such wear. This wear may reduce the useful lifetime of associated track components, causing expected lifetimes to be inaccurate and manual inspections to occur too late to save the associated parts. Further, reliance on wear sensors, such as the wear sensor of the '354 publication, that are not adapted to detect thrust bias wear may result in the problem going undetected.

The present disclosure is directed to overcoming one or more of the problems set forth above and/or other problems of the prior art.

SUMMARY

In one aspect, the present disclosure is directed to a thrust bias detection system for a mobile machine. The mobile machine may include a first track assembly and a second track assembly. The thrust bias detection system may include a first wear sensor configured to generate a signal indicative of a first wear measurement of a first track link surface, and a second wear sensor configured to generate a signal indicative of a second wear measurement of a second track link surface. The thrust bias detection system may also include a controller in communication with the first and second wear sensors and configured to determine whether at least one of the first and second track assemblies has experienced thrust bias, based on the signals.

In another aspect, the present disclosure is directed to a method of detecting thrust bias in a mobile machine. The mobile machine may include a first track assembly and a second track assembly. The method may include measuring a first amount of wear of a first track link surface, and measuring a second amount of wear of a second track link surface. The method may also include comparing a difference between the first amount of wear and the second amount of wear to a threshold value, and determining whether at least one of the first and second track assemblies has experienced thrust bias based on the comparison.

In yet another aspect, the present disclosure is directed to a thrust bias detection system for a mobile machine. The mobile machine may include a track assembly including a roller and a track link. The thrust bias detection system may include a wear sensor mounted to the track link and including a wear component and a processor. The wear sensor may be configured to generate a signal indicative of an amount of wear of a surface of the track link. The surface of the track link may be configured to contact a surface of a guide flange of the roller when the track assembly experiences thrust bias.

DETAILED DESCRIPTION

Figure 1:
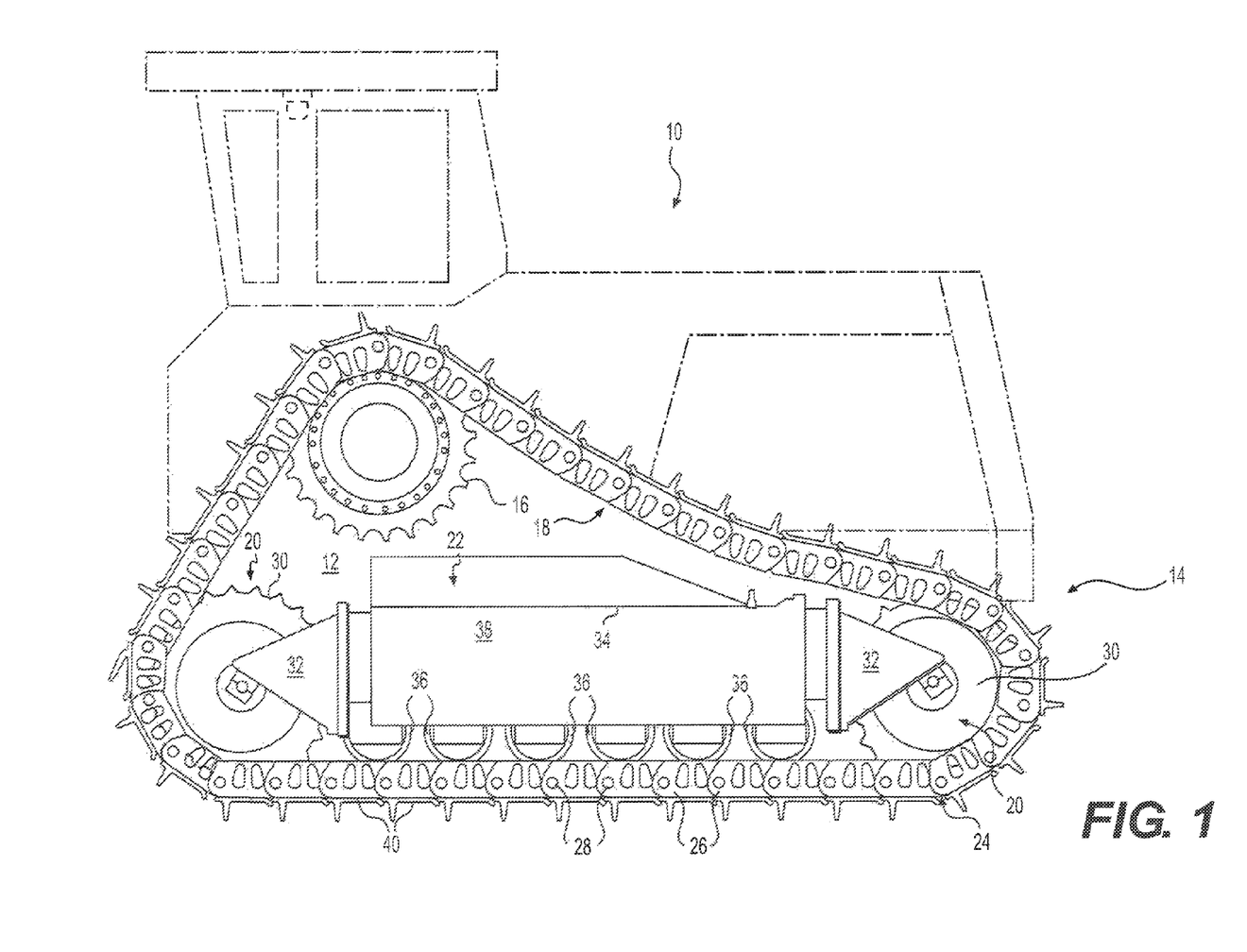
FIG. 1 illustrates a mobile machine having a track assembly and a thrust bias detection system.

FIG. 1 illustrates an exemplary track-type machine 10, consistent with disclosed embodiments. Track-type machine 10 may embody any machine that is driven, propelled, positioned, and/or maneuvered by operating a "continuous" track-type traction device. Such machines may include, for example, track-type tractors, skid steers, dozers, excavators, backhoes, track loaders, front shovels, rope shovels, or any other type of track-maneuverable machine. Machine 10 may include a frame 12 and a pair of track assemblies 14 (only one shown) secured to frame 12 on opposing sides of machine 10. Track assembly 14 may include a drive sprocket 16 coupled to a driving mechanism (not shown), and a chain assembly 18 operatively coupled to the driving mechanism by drive sprocket 16 and configured to propel machine 10.

The driving mechanism may include one or more components configured to generate a torque output. For example, the driving mechanism may include any suitable type of internal combustion engine, such as a gasoline, diesel, natural gas, or hybrid-powered engine or turbine. Alternatively or additionally, the driving mechanism may embody an electric motor, electrically coupled to an electric power source and configured to convert at least a portion of the electrical energy from the electric power output into mechanical energy. According to yet another embodiment, the driving mechanism may include a hydraulic motor fluidly coupled to a hydraulic pump and configured to convert a fluid pressurized by the pump into a torque output.

Drive sprocket 16 may be coupled to the driving mechanism via a shaft, which may provide an interface for delivering torque generated by the driving mechanism to drive sprocket 16. For example, drive sprocket 16 may be secured (e.g., welded, bolted, heat-coupled, etc.) to a hub associated with a shaft, so that drive sprocket 16 rotates in response to the torque generated by the driving mechanism. In some embodiments, drive sprocket 16 may be directly coupled via a drive shaft to the driving mechanism. Alternatively, drive sprocket 16 may be coupled to the driving mechanism via a torque converter (such as a gearbox, transmission, etc.), so that rotation of drive sprocket 16 is proportional to the torque generated by the driving mechanism.

Track assembly 14 may include a plurality of components that form the "continuous" track, ground-engaging portion of the drive system of machine 10. Track assembly 14 may include, among other things, drive sprocket 16, chain assembly 18, at least one idler assembly 20, a roller assembly 22, and a traction assembly 24. However, it should be understood that these components of track assembly 14 are exemplary only and not intended to be limiting. Accordingly, track assembly 14 may include additional and/or different components than those listed above.

Chain assembly 18 may form a continuous chain connected around outer portions of drive sprocket 16, idler assemblies 20, and roller assembly 22. Traction assembly 24 may be connected to an outer portion of chain assembly 18 and configured to engage a ground surface beneath track-type machine 10. In use, rotation of drive sprocket 16 may cause chain assembly 18 to move around drive sprocket 16, idler assemblies 20, and roller assembly 22, causing traction assembly 24 to engage the ground and thereby propel track-type machine 10 in a manner known in the art.

In an exemplary embodiment, chain assembly 18 may include a plurality of interconnected track links 26. It should be understood that "track link," as used herein, refers to any linkage component of a continuous chain for a track-type machine, and is not limited to track links 26 described herein. In one embodiment, adjacent (e.g., consecutive) track links 26 may be coupled together via a plurality of track pin assemblies 28. In an exemplary embodiment, chain assembly 18 may include two parallel sets of track links, connected to each other by track pin assemblies 28 (shown in FIG. 3).

Idler assemblies 20 may include components configured to guide chain assembly 18 as it moves around track assembly 14. For example, each idler assembly 20 may include an idler 30 and a mount 32. Idlers 30 may include features configured to engage chain assembly 18. For example, idlers 30 may include engagement surfaces configured to contact and guide track links 26 as they pass around idler 30. In some embodiments (such as idler 30 shown in FIG. 1), idler 30 may include idler teeth (e.g., between the engagement surfaces) configured to engage track pin assemblies 28. In other embodiments, the engagement surfaces may be separated by a flange.

Each mount 32 may hold idler 30 in place on machine 10 through connection to frame 12. In an exemplary embodiment, an adjustment mechanism 34 may be connected to at least one mount 32, such as to adjust a position of an associated idler 30 (e.g., extend one idler 30 away from another idler 30). Adjusting the position of idler 30 may increase or decrease the tension of chain assembly 18.

Roller assembly 22 may also include components configured to guide chain assembly 18. For example, roller assembly 22 may include a plurality of rollers 36 and a roller frame 38. Roller frame 38 may be mounted to frame 12 of machine 10. Rollers 36 may guide chain assembly 18 at a lower side of roller frame 38. Rollers 36 may each be suspended from roller frame 38. For example, each of rollers 36 may be rotationally supported on an axle suspended below roller frame 38. Rollers 36 may ride on and guide track links 26 as they pass under roller frame 38.

Traction assembly 24 may include a plurality of track shoes 40 secured to chain assembly 18. Each track shoe 40 may include a connecting portion configured to be secured to one or more track links 26 and a ground engaging portion configured to contact the ground. The ground engaging portion may include one or more features (e.g., grouser bars) that provide increased traction between track shoes 40 and the ground. It should be understood, however, that the disclosed embodiments may be used with any type of track shoe forming a part of a track assembly used by a track-type mobile machine. In some embodiments, track shoes 40 may be integrally formed with track links 26. In other embodiments, track shoes 40 may be omitted entirely from track assembly 14, so that surfaces of track links 26 that would otherwise contact track shoes 40 may contact the ground surface under machine 10.

Figure 2:
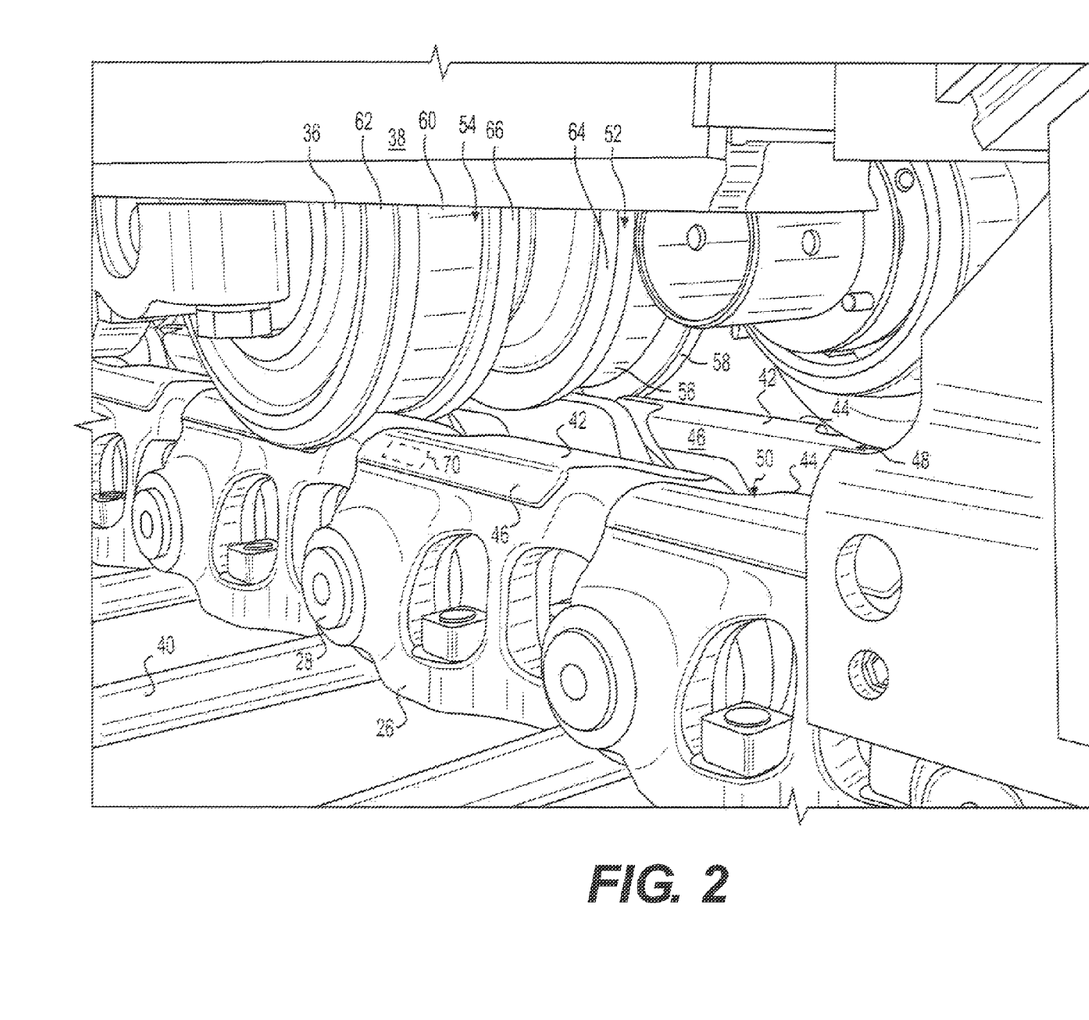
FIG. 2 illustrates a portion of the track assembly of FIG. 1.

FIG. 2 further depicts a lower portion of track assembly 14. As shown in FIG. 2, chain assembly 18 includes a plurality of track links 26 interconnected by track pin assemblies 28. Each track link 26 may include an engagement surface 42 and adjacent side walls 44, 46. Track links 26 may be arranged such that aligned engagement surfaces 42 form parallel tracks 48, 50 separated by track pin assemblies 28.

Rollers 36 may include features that guide the parallel tracks of chain assembly 18 as they pass under roller assembly 22. In particular, rollers 36 may include an inside roller body 52 and an outside roller body 54. As chain assembly 18 is guided by rollers 36, inside track 48 may pass under inside roller body 52 and outside track 50 may pass under outside roller body 54. In an exemplary embodiment, inside roller body 52 includes a contact surface 56 and an outer guide flange 58 extending away from and bordering contact surface 56. Outside roller body 54 may similarly include a contact surface 60 and an outer guide flange 62.

As shown in FIG. 2, outer guide flanges 58, 62 define outer limits of roller 36. That is, outer guide flanges, 58 and 62 are positioned to extend on opposite outer sides of parallel tracks 48, 50. In some embodiments, roller 36 may include a pair of inner guide flanges 64, 66, positioned to extend on opposite inner sides of parallel tracks 48, 50. In an exemplary embodiment of roller assembly 22, some of the plurality of rollers 36 may include both outer guide flanges and inner guide flanges, while other rollers 36 include only outer guide flanges (see FIG. 3 for one such example). Further, it should be understood that track assembly 14 on the opposite side of machine 10 (e.g., the side not shown in FIGS. 1-2), may include the same or similar features (see FIG. 3).

During normal operation of track assemblies 14, chain assembly 18 may pass under roller assembly 22, with engagement surfaces 42 of parallel tracks 48, 50 correspondingly engaging contact surfaces 56, 60. In this way, rollers 36 may act as guides to maintain chain assembly 18 on its path around track assembly 14. Outer guide flanges 58, 62 and inner guide flanges 64, 66 may create guide channels that help prevent tracks 48, 50 from deviating out of contact with contact surfaces 56, 60. That is, inner surfaces of outer guide flanges 58, 62 and inner guide flanges 64, 66 may provide a lateral force, if necessary, against side walls 44, 46 to help maintain parallel tracks 48, 50 on a desired path. Under certain conditions, however, the inner surfaces of outer guide flanges 58, 62 and/or inner guide flanges 64, 66 may experience an unexpected force that presses one or more of these surfaces against one or more of side walls 44, 46 of track links 26. This condition, known as thrust bias, may cause unexpected and accelerated wear at the inner surfaces of the guide flanges and/or at side walls 44, 46 as these surfaces frictionally engage each other under increased force.

Thrust bias (or other lateral forces) may cause accelerated wear at other locations along track assembly 14. For example, wear may accelerated between one of side walls 44, 46 of a track link 26 and drive sprocket 16 and/or idler 30. In these cases, either side wall 44 of outside track 50 or side wall 46 of inside track 48 (depending on the direction of the lateral force) may be forced toward a center flange of idler 30 and/or a center sprocket portion of drive sprocket 16 as chain assembly passes by these components. This may cause accelerated wear of the associated track links 26, as well as the center flange of idler 30 and center sprocket portion of drive sprocket 16.

Thrust bias may occur whenever machine 10 experience a condition that causes an above-described lateral force. For example, if machine 10 is overloaded, such as with a heavy work tool or cargo load, track assemblies 14 may be forced outward, pressing outer guide flange 58 of inside roller body 52 against side wall 44 of a track link 26 in inside track 48 on both sides of machine 10. In another example, machine 10 may experience a lateral force in one direction across both track assemblies 14. For example, if machine 10 is traversing laterally along a graded surface, a gravitational force may shift rollers 36 down-grade. This may, on the downgrade-side track assembly 14, press outer guide flange 58 of inside roller body 52 against side wall 44 of a track link 26 in inside track 48, and, on the upgrade side track assembly 14, press outer guide flange 62 of outside roller body 54 against side wall 46 of a track link 26 in outside track 50. If these or other thrust bias conditions occur, the contacting guide flange and track link surfaces may wear at an accelerated rate, reducing an expected lifetime of the corresponding parts (e.g., track links 26 and rollers 36). A similar effect may occur between surfaces of inside surfaces of chain assembly 18 and one or more of idler 30 and drive sprocket 16.

Figure 3:
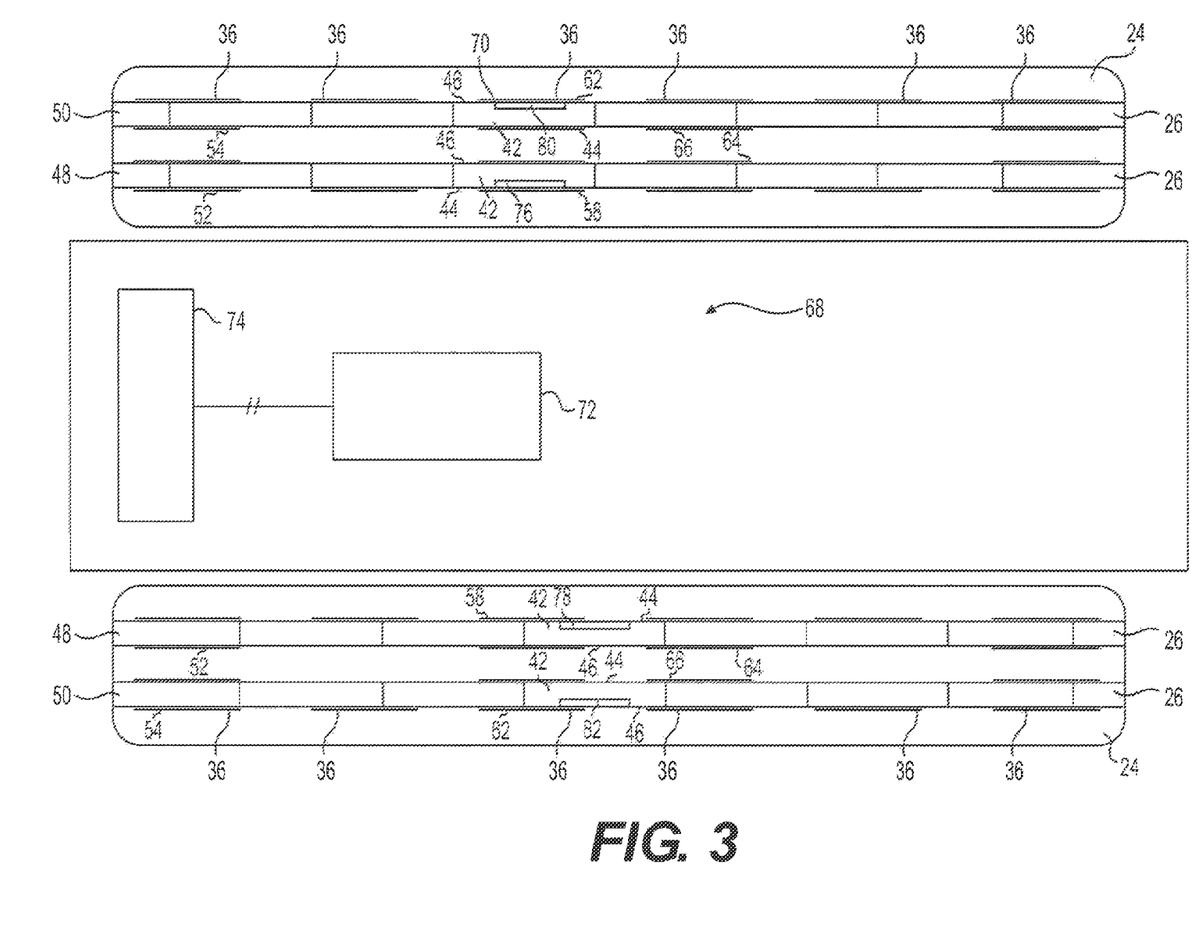
FIG. 3 schematically illustrates the thrust bias detection system of FIG. 1.

Machine 10 may include components configured to monitor track assembly 14 and determine whether track assembly 14 has experienced thrust bias (which includes instances where, at the time of detection, track assembly 14 continues to experience thrust bias and instances in which the thrust bias is no longer occurring). FIG. 3 schematically depicts a thrust bias detection system 68 that may be used in conjunction with machine 10 to detect thrust bias. In an exemplary embodiment, thrust bias detection system 68 may include components that detect wear which may be caused by thrust bias. In one embodiment, thrust bias detection system 68 may include at least one wear sensor 70, a controller 72, and a communication device 74.

In one embodiment, thrust bias detection system 68 may be configured to detect thrust bias by measuring wear at a location, and comparing the wear level to other known information to determine if accelerated wear is occurring in a manner that indicates thrust bias is likely. For example, wear sensor 70 may be positioned at an interface between track link 26 and one of outer guide flanges 58, 62.

Wear sensor 70 may be configured to detect wear at the interface in any of a variety of manners. In an exemplary embodiment, wear sensor 70 may be embedded in or adjacent to a surface of a track component such that the sensor itself wears away with the surface. In one example, wear sensor 70 may include a processor and a wear component (e.g., a resistor) that wears away with the corresponding track component. The processor (or other processing component such as controller 72) may be configured to determine an amount the component has worn at the surface based on an amount the wear component has worn. The processor may determine the amount the wear component has worn based on a change in a property (e.g., resistance level) of the wear component, as it wears.

As shown in FIG. 2, in an exemplary embodiment, wear sensor 70 may be mounted at (e.g., embedded in) a side wall 44 or 46 of a track link 26. Side walls 44, 46 may be angled with respect to engagement surface 42, and configured to contact one of outer guide flanges 58, 62 or inner guide flanges 64, 66 when thrust bias occurs. In this way, accelerated wear due to thrust bias may be detected by wear sensor 70. In some embodiments, wear sensor 70 may alternatively or additionally be mounted to a roller 36, at an inner surface of one of outer guide flanges 58, 62 or inner guide flanges 64. Wear sensor 70 may be configured to generate a signal indicative of wear at the corresponding interface, and transmit the signal (e.g., wirelessly) to controller 72.

Controller 72 may embody a single microprocessor or multiple microprocessors that include a means for controlling an operation of thrust bias detection system 68. Numerous commercially available microprocessors can be configured to perform the functions of controller 72. It should be appreciated that controller 72 could readily be, at least in part, an electronic control module (ECM) of machine 10. Controller 72 may include a memory, a secondary storage device, a processor, and any other components for running an application. Various other circuits may be associated with controller 72 such as power supply circuitry, signal conditioning circuitry, solenoid driver circuitry, and other types of circuitry.

Controller 72 may be configured to determine whether machine 10 is experiencing thrust bias based on signals received from wear sensor(s) 70. In one embodiment, controller 72 may receive wear information from one wear sensor 70 and compare the wear information to an amount of wear that may be expected, which may be based on an amount of use of machine 10 (e.g., work hours) and a normal wear rate for the component at that location (e.g., based on historical values). In other embodiments, controller 72 may receive wear information from at least two wear sensors 70 and compare the wear information to determine if thrust bias is likely occurring. For example, if one wear sensor 70 reports greater wear (e.g., exceeds a threshold difference) than a wear sensor 70 at another location on machine 10, machine 10 may be experiencing thrust bias that is causing the different wear rates.

FIG. 3 further depicts exemplary configurations that include a plurality of wear sensors 70 for detecting thrust bias. In particular, wear sensors 70 may include a pair of inner wear sensors 76, 78 and a pair of outer wear sensors 80, 82. Inner wear sensors 76, 78 may be mounted to side walls 44 of track links 26 in inside tracks 48 of chain assemblies 18, on opposite sides of machine 10. Inner wear sensors 76, 78 may thus be configured to measure wear caused by rollers 36 being forced away from a center of machine 10. Outer wear sensors 80, 82 may be mounted to side walls 46 of track links 26 in outside tracks 50 of chain assemblies 18, on opposite sides of machine 10. Outer wear sensors 80, 82 may thus be configured to measure wear caused by rollers 36 being forced toward the center of machine 10. Various embodiments of wear detection system 68 may include two or more of wear sensors 76, 78, 80, 82.

In one embodiment, thrust bias detection system 68 may include at least inner wear sensors 76, 78, which are positioned at corresponding locations on opposite track assemblies 14. For example, inner wear sensors 76, 78 may be positioned at inner side walls 44 of track links 26 in opposite-side inside tracks 48. If thrust bias that produces a lateral force in one direction across machine 10 (or only on one side of machine 10) is present, one of inner wear sensors 76, 78 will wear at an accelerated rate, while the other will not. This is because one roller 36 will be forced toward a corresponding one of wear sensors 76, 78, while the other roller 36 will be forced away from (or at least not forced toward) the other of wear sensors 76, 78. A thrust bias detection system 68 that includes at least outer wear sensors 80, 82 may similarly be configured to detect thrust bias that produces a unidirectional force across machine 10.

In another embodiment, thrust bias detection system 68 may include at least one of inner wear sensors 76, 78 and at least one of outer wear sensors 80, 82. For example, thrust bias detection system 68 may include inner wear sensor 76 and outer wear sensor 80, which may be positioned on the same track assembly 14, on opposite side walls 44, 46 of inner and outside tracks 48, 50, as shown in FIG. 3. If thrust bias on the associated track assembly 14 is present, one of wear sensors 76, 80 will wear at an accelerated rate due to a force in one direction across the same track assembly 14 forcing only one of wear sensors 76, 80 toward a guide flange. Wear sensors 80, 82 may be similarly used to detect thrust bias on the opposite-side track assembly 14.

An exemplary embodiment of thrust bias detection system 68 may include three wear sensors 70. For example, thrust bias detection system 68 may include two wear sensors 70 on one track assembly 14 (e.g., wear sensors 76, 80) and one wear sensor 70 on the opposite-side track assembly 14 (e.g., wear sensor 78). In this way, wear sensors 76, 80 may be used to detect thrust bias that affects at least track assembly 14 that includes wear sensors 76, 80 and wear sensors 76, 78 may be used to detect thrust bias that affects only track assembly 14 that does not include wear sensors 76, 80.

In an alternative embodiment, at least one wear sensor 70 may be configured to measure wear that occurs between a track link 26 and at least one of a center flange of idler 30 and a center sprocket portion of drive sprocket 16. For example, a wear sensor 70 may be mounted to at least one of side wall 44 of a track link 26 in outside track 50 and side wall 46 of a track link 26 in inside track 48. These wear sensors 70 may be configured to measure wear that occurs between the associated track link 26 and one or more of idler 30 and drive sprocket 16, including accelerated wear that may occur due to thrust bias.

Regardless of the precise wear sensor configuration of thrust bias detection system 68, the wear sensors 70 that are included may generate signals corresponding to an amount of wear detected. Controller 72 may be configured to compare wear measurements from at least two of wear sensors 76, 78, 80, 82 to determine whether one wear sensor is experiencing accelerated wear, and thus, that thrust bias is likely present. Controller 72 may transmit signals to communication device 74 including wear information and/or determinations regarding thrust bias.

Communication device 74 may be a computing device located on-board machine 10 (e.g., inside an operator cabin) or off-board machine 10 (e.g., at a control station). For example, communication may be a dashboard or other computer including at least a processor and a display. Communication device 74 may communicate with controller 72 (e.g., via a wired or wireless connection) to receive wear information collected by wear sensor(s) 70. In an exemplary embodiment, communication device 74 may display information (e.g., to an operator of machine 10 or service personnel) collected by wear sensor(s) 70 and/or determined by controller 72. This information may include, for example, the presences or absence of thrust bias, suggestions for correcting detected thrust bias, safety messages regarding the state of track assembly 14, an estimated operating time left until service will be necessary, etc.

INDUSTRIAL APPLICABILITY

The detection system of the present disclosure may be applicable to detecting thrust bias in any track-type mobile machine. The disclosed thrust bias detection system may be particularly applicable to detecting thrust bias that causes certain portions of a track assembly to wear at an accelerated rate. For example, the disclosed thrust bias detection system may be suitable for detecting thrust bias that causes rollers and/or track links to wear at interfaces besides the primary engagement surfaces, such as an interface between a roller guide flange and a track link side wall.

As machine 10 operates, chain assembly 18 passes around drive sprocket 16, idlers 30, and rollers 36, causing traction assembly 24 to engage the ground and propel machine 10. As described herein, certain operating conditions may cause machine 10 to experience thrust bias. That is, some conditions may produce a lateral force on one or both of track assemblies 14, the lateral force being directed either generally toward a center of machine 10 or generally away from the center of machine 10.

As shown in FIG. 2, at least one wear sensor 70 may be positioned to measure wear that occurs as a result of thrust bias. In one example, wear sensor 70 may be positioned to measure wear that occurs (and/or is accelerated) when an inner surface of an outer guide flange 58 or 62 is forced against a side wall 44 or 46 of a track link 26 that passes under a corresponding roller 36. It should be understood however, that other configurations of wear sensor 70 may achieve the intended goal of measuring wear at a location where thrust bias affects wear rate of the components.

In one exemplary process, controller 72 may receive wear measurements from at least one wear sensor 70. Controller 72 may use a map, look-up table, algorithm, equation, etc., to determine whether the at least one wear sensor 70 is experiencing abnormal wear. For example, controller 72 may use a measured amount of wear and a period of time that machine 10 has been in operation to determine a wear rate associated with wear sensor 70. Controller 72 may compare the determined wear rate to an expected wear rate for the associated components to determine whether abnormal wear has occurred. In some embodiments, controller 72 may monitor several wear sensors 70 (e.g., wear sensors 76, 78, 80, 82) such that multiple types of thrust bias may be detected, since different types of thrust bias may produce accelerated wear in different locations. These locations may include, for example, a surface of a track link 26 (e.g., side walls 44, 46) that is configured to contact any of a surface of a guide flange (e.g., any of guide flanges 58, 62, 64, 66) of a roller 36, a surface of a center flange of idler 30, and a surface of center sprocket portion of drive sprocket 16, when track assembly 14 experiences thrust bias.

In another exemplary process, controller 72 may receive wear measurements from at least two wear sensors 70. For example, controller 72 may receive wear measurements from inner wear sensors 76, 78. Controller 72 may compare the wear measurements to determine whether one track assembly 14 has experienced more wear than the other track assembly 14 at those locations. For example, controller 72 may determine a difference between the wear measurements, and compare the difference to a threshold value. If the difference exceeds the threshold value, controller 72 may determine that track assembly 14 has experienced thrust bias.

Another disclosed process may include controller 72 monitoring three wear sensors 70 for accelerated wear. For example, controller 72 may monitor wear measurements from wear sensors 76, 78, and 80, and compare the results. If any of the wear sensors 76, 78, 80 experiences wear that is abnormal compared to at least one of the other wear sensors 76, 78, 80, controller 72 may determine that thrust bias is likely present. Wear sensor 82 may be optionally included and monitored by controller 72 to allow for a more robust wear analysis.

If controller 72 determines that thrust bias is present, controller 72 may transmit a signal to communication device 74 to alert an operator or service personnel. Controller 72 may transmit a message that indicates that accelerated wear has occurred and machine 10 should be inspected for thrust bias. Controller 72 may communicate a location where thrust bias may be present (e.g., which track assembly 14, which track 48, 50, which side, etc.). Controller 72 and/or communication device 74 may also generate recommendations for correcting the thrust bias. For example, communication device 74 may suggest that the camber of a pivot shaft associated with one or more track assembly 14 be adjusted, or suggest that machine 10 is moved to a new location or rotated in orientation.

The disclosed thrust bias detection system allows for automated detection of thrust bias associated with a mobile machine. The automated detection may allow an operator or other service personnel to become aware of the thrust bias earlier than they may otherwise be. In particular, instead of determining that thrust bias is occurring during a periodic inspection (at which point it may be too late to save the associated parts), the disclosed thrust bias detection system may provide an indication of thrust bias shortly after it begins to occur, allowing for correction of the thrust bias and/or replacement of the associated parts before damage occurs.

It will be apparent to those skilled in the art that various modifications and variations can be made to the disclosed thrust bias detection system. Other embodiments will be apparent to those skilled in the art from consideration of the specification and practice of the disclosed thrust bias detection system. It is intended that the specification and examples be considered as exemplary only, with a true scope being indicated by the following claims and their equivalents.

What is claimed is:

1. A thrust bias detection system for a mobile machine having a first track assembly and a second track assembly, the thrust bias detection system comprising:

a first wear sensor configured to generate a signal indicative of a first wear measurement of a first track link surface;

a second wear sensor configured to generate a signal indicative of a second wear measurement of a second track link surface; and a controller in communication with the first and second wear sensors and configured to determine whether at least one of the first and second track assemblies has experienced thrust bias, based on the signals.

2. The thrust bias detection system of claim 1, wherein determining whether at least one of the first and second track assemblies has experienced thrust bias includes comparing the first wear measurement to the second wear measurement.

3. The thrust bias detection system of claim 2, wherein determining whether at least one of the first and second track assemblies has experienced thrust bias includes comparing a difference between the first wear measurement and the second wear measurement to a threshold amount.

4. The thrust bias detection system of claim 1, wherein the first track link surface and the second track link surface are located in the first track assembly.

5. The thrust bias detection system of claim 4, wherein:
each of the first and second track assemblies includes a pair of parallel tracks, and
the first track link surface and the second track link surface are located in different tracks of the pair of parallel tracks in the first track assembly.

6. The thrust bias detection system of claim 1, wherein the first track link surface is located in the first track assembly and the second track link surface is located in the second track assembly.

7. The thrust bias detection system of claim 6, wherein:
each of the first and second track assemblies includes an inside track and an outside track, and
the first track link surface is located in the inside track of the first track assembly and the second track link surface is located in the inside track of the second track assembly.

8. The thrust bias detection system of claim 1, further including a third wear sensor configured to generate a signal indicative of a third wear measurement of a third track link surface.

9. The thrust bias detection system of claim 8, wherein determining whether at least one of the first and second track assemblies has experienced thrust bias includes comparing the first, second, and third wear measurements to each other.

10. The thrust bias detection system of claim 8, wherein the first track link surface and the second track link surface are located in the first track assembly and the third track link surface is located in the second track assembly.

11. The thrust bias detection system of claim 1, wherein the first wear sensor includes a wear component configured to wear with the first track link surface.

12. The thrust bias detection system of claim 11, wherein the first wear sensor further includes a processor configured to communicate with the controller.

13. The thrust bias detection system of claim 11, wherein the first track link surface is a side wall of a track link, the side wall being angled with respect to an engagement surface of the track link.

14. A method of detecting thrust bias in a mobile machine having a first track assembly and a second track assembly, the method comprising:

measuring a first amount of wear of a first track link surface;

measuring a second amount of wear of a second track link surface;

comparing a difference between the first amount of wear and the second amount of wear to a threshold value;

determining whether at least one of the first and second track assemblies has experienced thrust bias based on the comparison.

15. The method of claim 14, wherein the first track link surface and the second track link surface are located in the first track assembly.

16. The method of claim 15, wherein:

each of the first and second track assemblies includes a pair of parallel tracks, and the first track link surface and the second track link surface are located in different tracks of the pair of parallel tracks in the first track assembly.

17. The method of claim 14, wherein the first track link surface is located in the first track assembly and the second track link surface is located in the second track assembly.

\* \* \* \* \*